No. 638,067. Patented Nov. 28, 1899.
E. ROOCH.
BICYCLE.
(Application filed Feb. 23, 1898.)
(No Model.) 2 Sheets—Sheet 1.
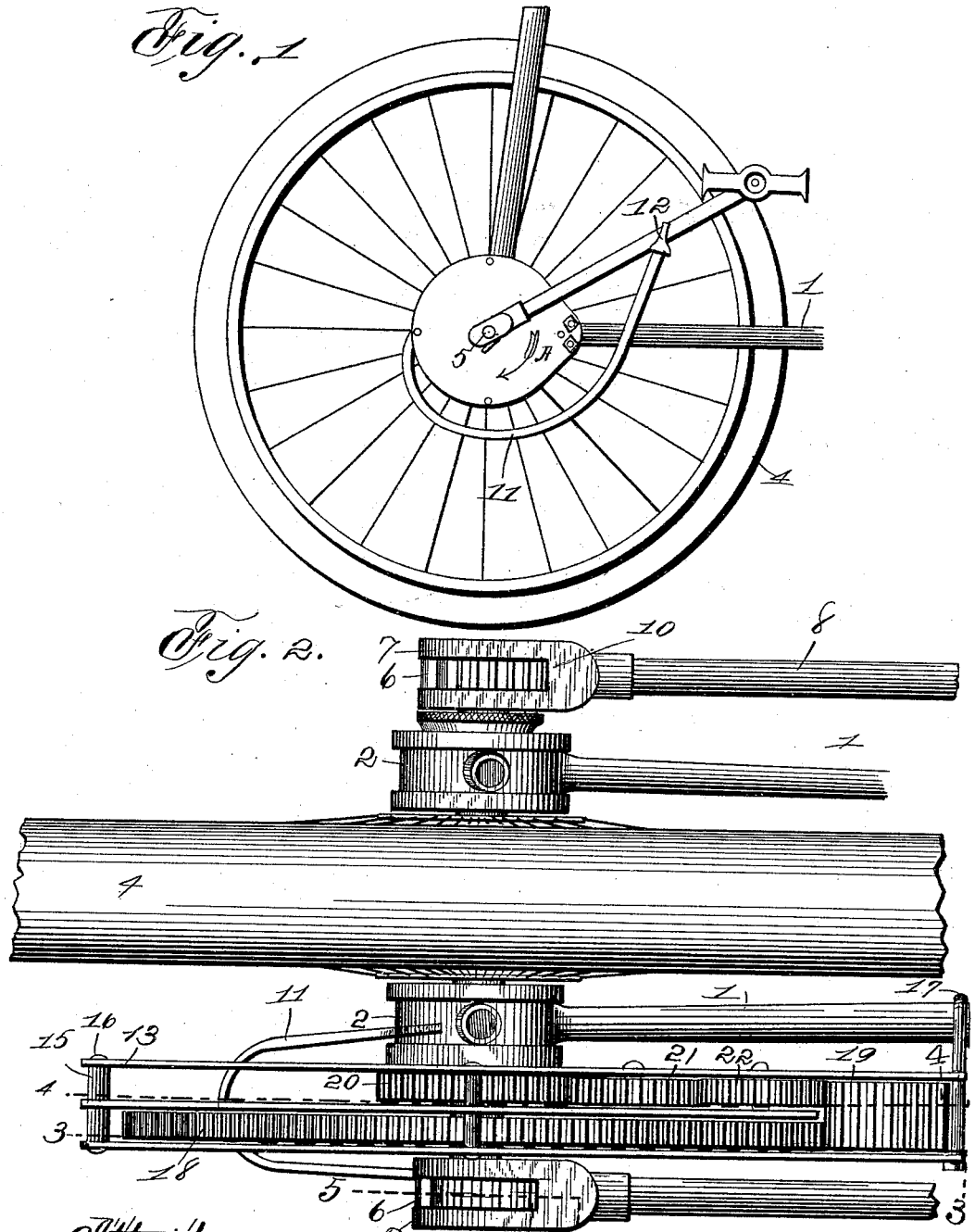
Attest:
A. J. McCauley.
M. P. Smith.
Inventor:
Edward Rooch,
by Higdon, Longan & Higdon,
Atty's.

No. 638,067. Patented Nov. 28, 1899.
E. ROOCH.
BICYCLE.
(Application filed Feb. 23, 1898.)
(No Model.) 2 Sheets—Sheet 2.
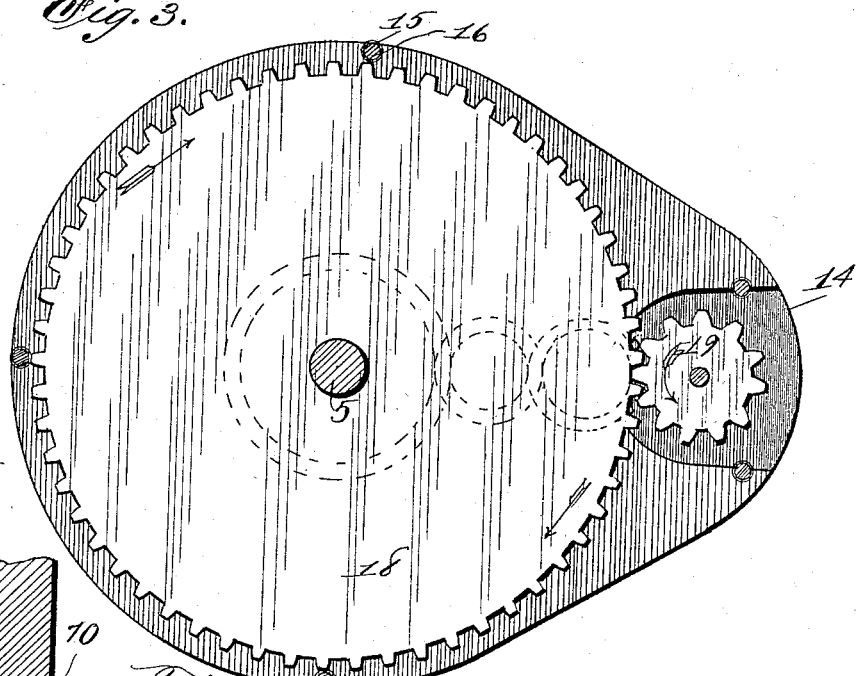
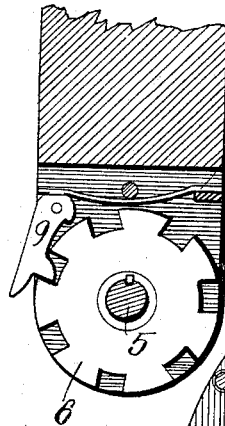
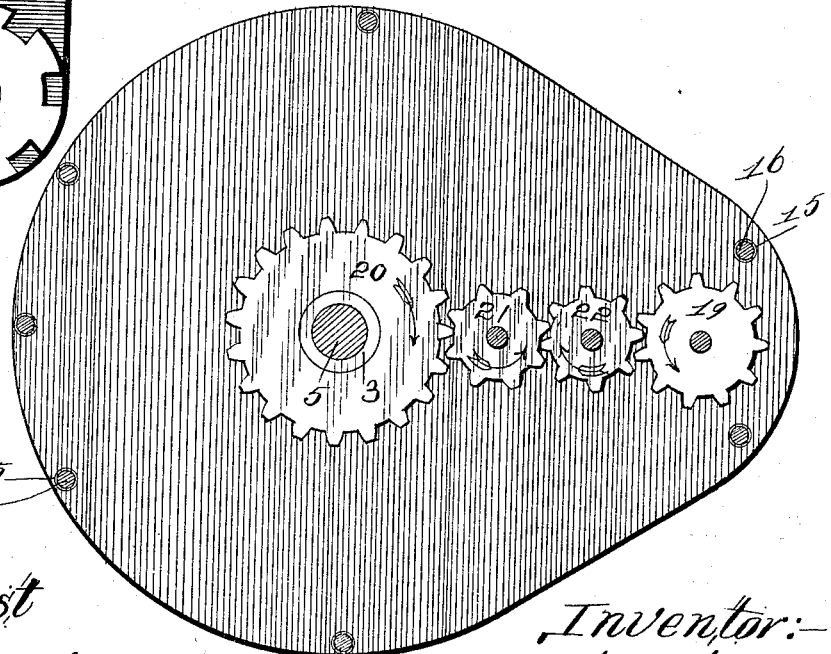
Attest
A. J. McCauley
W. R. Smith
Inventor:—
Edward Rooch,
by Higdon, Longan & Higdon,
Attys.

UNITED STATES PATENT OFFICE.

EDWARD ROOCH, OF ST. LOUIS, MISSOURI.

BICYCLE.

SPECIFICATION forming part of Letters Patent No. 638,067, dated November 28, 1899.

Application filed February 23, 1898. Serial No. 671,354. (No model.)

*To all whom it may concern:*

Be it known that I, EDWARD ROOCH, of the city of St. Louis, State of Missouri, have invented certain new and useful Improvements in Bicycles, of which the following is a full, clear, and exact description, reference being had to the accompanying drawings, forming a part hereof.

My invention relates to bicycle-gears; and it consists of the novel construction, combination, and arrangement of parts hereinafter shown, described, and claimed.

Figure 1 is a side elevation of the rear wheel of a bicycle provided with my improved gearing. Fig. 2 is an enlarged plan view of the hub of the rear wheel with the gearing in position relative thereto. Fig. 3 is a sectional view taken approximately on the line 3 3 of Fig. 2. Fig. 4 is a sectional view taken approximately on the line 4 4 of Fig. 2. Fig. 5 is an enlarged sectional view taken approximately on the line 5 5 of Fig. 2.

Referring by numerals to the accompanying drawings, 1 indicates the lower rear fork of the bicycle-frame, the ends of which fork are provided with ordinary ball-bearings 2, in which is rotatably mounted the hollow axle or sleeve 3 of the rear bicycle-wheel 4. Arranged to rotate in said hollow axle or sleeve 3 is a shaft 5, the ends of which project a slight distance beyond the sleeve at each end thereof. Rigidly fixed upon each end of this shaft 5 is a ratchet-wheel 6, and rotatably arranged upon the shaft 5 in juxtaposition to these ratchet-wheels 6 are the bifurcated heads 7, to which are fixed the ends of the pedal-levers 8. Pawls 9 are pivoted in the bifurcated heads 7 in such a manner that the points of said pawls will readily engage between the teeth of the ratchet-wheel 6, and leaf-springs 10 are arranged in the bifurcated heads 7 in such a manner as that the ends of said leaf-springs will engage against the ends of the pawls 9 and hold them in or out of operative positions.

A spring-arm 11 is secured to each of the hubs 2 and extends from thence downwardly and rearwardly and then forwardly and upwardly, their upper ends terminating in yokes 12, that engage the forward ends of the pedal-levers 8, the normal tendency of said spring-arms being to keep said pedal-levers elevated.

Located upon one end of the shaft 5 between the bearing 2 and the ratchet-wheel 6 is a frame or casing constructed of three plates 13, the same being uniform in size and construction, with the exception that the central plate is provided in its forward end with a recess or cut-away portion 14, and these plates are held at equal distances apart by the collars 15, located upon the rivets or screws 16, that fasten said plates together. This frame so constructed is held to one arm of the fork 1 of the frame of the bicycle by a clip 17, that passes around said arm and through the forward end of the frame. Rigidly carried by the shaft 5 and arranged to operate between the central plate and the outer plate is a large gear-wheel 18.

Arranged for rotation in the recess 14 between the two outer plates is a pinion 19, which is double the width of the gear-wheel 18, said pinion 19 being in mesh with said gear-wheel 18.

Rigidly carried by the tubular axle or sleeve 3 and arranged to operate between the central plate and the inner plate is a pinion 20, and intermediate pinions 21 and 22 are rotatably arranged upon suitable bearings between the inner plate and the central plate, and said intermediate pinions 21 and 22 form means whereby the rotary motion of the pinion 19 is transferred to the pinion 20.

To operate my improved bicycle, the rider mounts the seat in the ordinary manner and, placing his feet upon the pedals of the levers 8, alternately moves said levers downwardly, said downward movement storing power in the spring-arms 11, which power is exerted to return the levers to their upward limit of movement when the pressure of the foot is released. With the downward movement of the levers the pawls 9, which have previously been thrown into operation, will engage with the teeth of the ratchet-wheels 6 and drive said ratchet-wheels in the direction indicated by the arrow A, Fig. 1. Said ratchet-wheels being fixed upon the shaft 5, said shaft will necessarily be driven in the same direction, and the gear-wheel 18 being fixed upon said shaft 5 said gear-wheel will be driven in the same direction. The rotary motion thus given to the gear-wheel 18 will be transferred to the double-width pinion 19, and the rotary motion of said pinion 10 will be transferred, through the intermediate pinions 21 and 22, in the direction indicated by the arrows thereon in Fig. 4 to the pinion 20, which is fixed upon the tubular axle or sleeve, in which the bicycle-wheel is fixed. Thus the pedal motion is transferred to rotary motion and said rotary motion imparted to the rear wheel of the bicycle, which necessarily drives the bicycle forward and accomplishes the desired result. By making the various pinions and gear-wheels in proper sizes and making the levers 8 sufficiently long the bicycle can be driven at a very high rate of speed, this being one of the objects contemplated by my invention.

By the construction herein shown and described the use of a chain and sprocket-wheels is dispensed with, a light, strong, and durable gearing is produced, and, if desired, the gearing may be inclosed in a dust and water proof casing.

I claim—

The combination with the rear axle of a bicycle, of the tubular sleeve or hub of said rear wheel, ratchet-wheels 6 rigidly fixed upon the axle, spring-actuated pedal-arms 11 rotatably arranged upon the ends of said axle, pawls 9 carried by said pedal-arms for engaging the teeth of the ratchet-wheels, the lower rear fork, the parallel plates 13 framed together and fixed to said fork, a large gear-wheel 18 fixed on the rear-wheel axle and mounted between two of said parallel plates, the gears 20, 21, 22 arranged alongside of said large gear-wheel to transmit power to the hub of said rear wheel, and the wide-faced pinion 19 meshing with both the gear-wheel 18 and the gears 20, 21, 22, substantially as herein specified.

In testimony whereof I affix my signature in presence of two witnesses.

EDWARD ROOCH.

Witnesses:
ALBERT J. MCCAULEY,
JOHN C. HIGDON.